United States Patent
Phan

(10) Patent No.: US 8,984,326 B2
(45) Date of Patent: Mar. 17, 2015

(54) TESTING DISASTER RECOVERY ELEMENTS

(75) Inventor: Ricky Phan, Fairfield (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 11/931,677

(22) Filed: Oct. 31, 2007

(65) Prior Publication Data

US 2009/0113233 A1 Apr. 30, 2009

(51) Int. Cl.
*G06F 11/00* (2006.01)
*G06F 11/20* (2006.01)

(52) U.S. Cl.
CPC .................................. *G06F 11/2028* (2013.01)
USPC .................................. 714/2; 714/4.1; 714/25

(58) Field of Classification Search
CPC .......................... G06F 11/3688; G06F 11/3684
USPC .................................................. 714/2, 4.1, 25
See application file for complete search history.

(56) References Cited

U.S. PATENT DOCUMENTS

| | | |
|---|---|---|
| 5,608,865 A | 3/1997 | Midgely et al. |
| 6,442,709 B1 | 8/2002 | Beal et al. |
| 7,058,853 B1 | 6/2006 | Kavanappillil et al. |
| 7,120,834 B1 * | 10/2006 | Bishara ............................ 714/43 |
| 7,383,463 B2 * | 6/2008 | Hayden et al. ..................... 714/4 |
| 2004/0172528 A1 | 9/2004 | Tenereillo |
| 2004/0205382 A1 | 10/2004 | Noda et al. |
| 2006/0015641 A1 | 1/2006 | Ocko et al. |
| 2006/0075279 A1 | 4/2006 | Cameros et al. |
| 2006/0179147 A1 * | 8/2006 | Tran et al. ..................... 709/227 |
| 2006/0190771 A1 * | 8/2006 | Hefner ............................. 714/38 |
| 2007/0076590 A1 * | 4/2007 | Galpin et al. ................. 370/216 |
| 2007/0079171 A1 * | 4/2007 | Aidun ............................... 714/6 |
| 2007/0244937 A1 | 10/2007 | Flynn, Jr. et al. |
| 2007/0250626 A1 | 10/2007 | Phan |
| 2008/0126859 A1 * | 5/2008 | Guo et al. ....................... 714/25 |

FOREIGN PATENT DOCUMENTS

| | | |
|---|---|---|
| WO | WO 2004/023620 | 3/2004 |
| WO | WO 2006/108260 | 10/2006 |

OTHER PUBLICATIONS

Notification of Transmittal of the International Search Report and the Written Opinion of the International Searching Authority of Application No. PCT/US2008/065044, filed May 29, 2008, mailed Nov. 19, 2008 (13 pages).

* cited by examiner

*Primary Examiner* — Sarai Butler

(57) ABSTRACT

Testing disaster recovery elements can be performed by configuring a disaster recovery site with network addresses to disaster recovery elements at an application layer. End-to-end operation of the disaster recovery site is verified using the network addresses at the application layer. The disaster recovery site is verified while an associated production site is operating.

20 Claims, 3 Drawing Sheets

TESTING DISASTER RECOVERY ELEMENTS

TECHNICAL FIELD

This invention relates to network communication and, more particularly, to testing disaster recovery elements.

BACKGROUND

Businesses rely on data processing systems to manage a wide range of internal and external functions, including accounting and inventory functions, data management functions, and many others. Further, many of these systems must be available to be accessed over local or wide-area data processing system networks, including both private networks and public networks such as the internet.

In the event of a "disaster," which can include both actual natural disasters and other events, a primary system may be "down" or otherwise unavailable, which can be costly and damaging. In response, many businesses and other enterprises maintain "disaster recovery" systems or environments, which can include redundant systems that provide some or all of the functions of the primary systems, and typically include full backups of all the data available to the primary systems. In this way, in the event of a disaster, users can transition to the disaster recovery environment until the primary system can be restored, thus minimizing lost productivity.

SUMMARY

Testing disaster recovery elements can be performed by configuring a disaster recovery site with network addresses to disaster recovery elements at an application layer. End-to-end operation of the disaster recovery site is verified using the network addresses at the application layer. The disaster recovery site is verified while an associated production site is operating.

Implementations may include one or more of the following features. The disaster-recovery network addresses to the disaster recovery elements may be based, at least in part, on network addresses for network elements in the production site. The disaster-recovery network addresses may be subdomains of the production network addresses. Configuring the disaster recovery site may include storing the disaster-recovery network addresses in configuration files locally stored on the disaster-recovery network elements. The disaster-recovery network addresses may be stored in at least one Domain Name Server (DNS). Verifying end-to-end operation of the disaster recovery site may include verifying interfaces between the disaster-recovery elements by executing one or more end-to-end transactions. The disaster-recovery network elements may be substantially similar to network elements in the production site.

The method may be implemented in a system, apparatus, or computer software, including instructions stored in a computer-readable medium for causing data processing apparatus to perform one or more of the operations. A system implementing the method may include one or more processors for performing operations in accordance with instructions stored in one or more memories.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
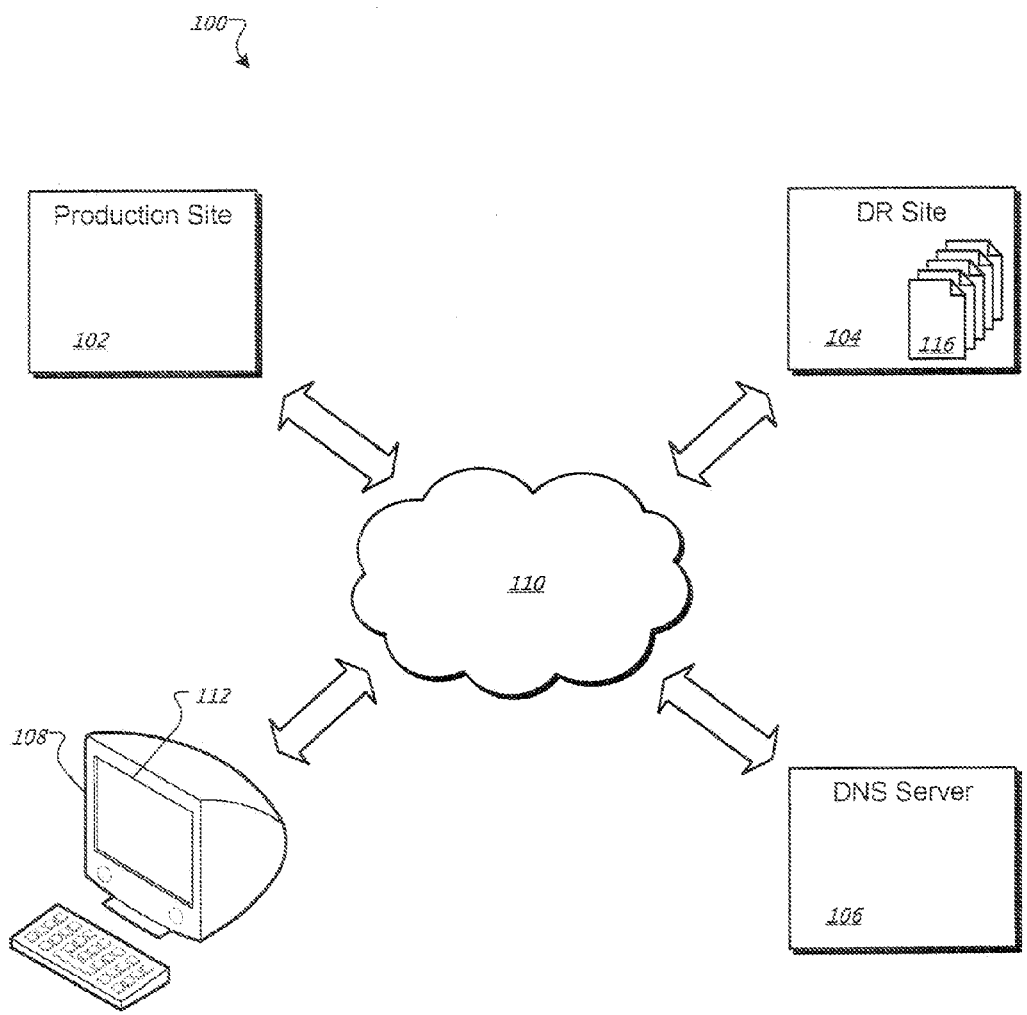
FIG. 1 is a block diagram of a processing system in accordance with some implementations of the present disclosure.

FIG. 1 is an example data processing system 100 for end-to-end testing of a disaster recovery site in accordance with some implementations of the present disclosure. For example, the system 100 may execute one or more test transactions to verify that disaster-recovery network elements (e.g., servers) operate in accordance with one or more specifications. In some implementations, a transaction may include applications executed by different network elements where at least some of the network elements interface other network elements during the transaction. In other words, the system 100 may invoke a plurality of network elements and associated interfaces to provide requested services. For example, the system 100 may include a production site that executes transactions including a plurality of network elements and associated interfaces. In addition, the system 100 may include a disaster recovery (DR) site that, in some implementations, includes redundant elements and interfaces to provide such services in response to at least a DR event. In this implementation, the DR site executes transactions while the production site is not operational. In testing the operation of the DR site, the system 100 may execute end-to-end transactions that, in some implementations, verify that the interfaces between the different DR elements. To eliminate, minimize, or otherwise reduce the time that the production site is not operational during testing, the system 100 can, in some implementations, provide network addresses for these DR elements at the application layer.

At a high level, the system 100 includes a production site 102, a DR site 104, a DNS server 106, and a client 108 coupled through a network 110. The production site 102 provides services to the client 108 through the network 110. The DR site 104 provides the services to the client 108 in the event that the production site 102 is not operating. The DNS server 106 maps Uniform Resource Locators (URLs) to network address for routing communications between elements in the system 100. While the production site 102, the DR site 104, the DNS server 106, and the client 108 are illustrated as single elements, each element may be a plurality of elements and/or geographically distributed. As for a high level operational description, the client 108 may transmit a request for services to the DR site 104. In response to at least the request, the DR site 104 may execute applications in different DR network elements. In executing the applications, the DR site 104 may identify the URLs for the different DR network elements at the application layer. The application layer may include a plurality of applications where at least a subset of the applications reside on different DR network elements in the DR site. For example, the DR site 104 may include files 116 that identify the DR URLs. In some cases, the DR site 104 includes applications residing on different DR network elements having associated resource files 116. In some implementations, the files 116 can include configuration files, application code, database tables, and/or other files.

Turning to a more detailed description, the production site 102 can include any software, hardware, and/or firmware configured to provide services to the client 108. For example, the production site 102 may provide online services to users that include a plurality of different servers and/or storage units. In some implementations, the production site 102 can include web servers executing a distributed transaction in response to a request from the client 108. In general, the production site 102 may execute one or more of the following: receiving a request for one or more services through the network 110, identifying one or more network elements in the production site 102 for executing the transactions, communicating with the different network elements using interfaces, and/or providing the requested services based, at least in part, on the executed transactions. The production site 102 can be implemented using devices or computers other than servers, as well as a server pool. Indeed, the production site 102 may include any computer or processing device such as, for example, blade servers, general-purpose personal computers (PCs), Macintoshes, workstations, Unix-based computers, and/or any other suitable devices. In other words, the production site 102 may include computers other than general purpose computers as well as computers without conventional operating systems. In computing device implementations, the production site 102 may be adapted to execute a number of operating systems such as Linux, UNIX, Windows Server, and/or any other suitable operating systems. In certain implementations, the production site 102 may also include or be communicably coupled with the DNS server 106 and/or the client 108.

In addition, the production site 102 can, in some implementations, include memory (not illustrated). The memory may be a local memory and include any memory or database module and may take the form of volatile or non-volatile memory including, without limitation, magnetic media, optical media, random access memory (RAM), read-only memory (ROM), removable media, or any other suitable local or remote memory component. In some implementations, the production site 102 may include a Storage Area Network (SAN). The memory may include any other appropriate data such as VPN applications or services, firewall policies, a security or access log, print or other reporting files, HTML files or templates, data classes or object interfaces, child software applications or sub-systems, and others. In providing services, the production site 102 may store Web pages comprising displays through which information can be presented to users of the client 108. In general, the Web pages may include any machine readable and machine storable work product that may generate or be used to generate a display through, for example, a Graphical User Interface. The Web pages may be a file, a combination of files, dynamically generated by the production site 102 based on suitable parameters (e.g., user profile, user demographics, previous selections of the user), one or more files with embedded links to other files, etc. The Web pages may include text, audio, image, video, animation, and other attributes.

The DR site 104 can include any software, hardware, and/or firmware configured to provide services to the client 108 in the event that the production site 102 is not operational. For example, in response to identifying an error in the operation of the production site 102, the DR site 104 can, in some implementations, provide services requested by the client 108. In some implementations, the DR site 104 includes redundant elements that execute all or some of the same features and functions of the production site 102. For example, the DR site 104 may include network elements with the same applications and interfaces for executing one or more transactions. In addition, the DR site 104 may include memory (e.g., SAN) that is periodically updated with data stored at the production site 102. In the illustrated implementation, the DR site 104 includes one or more resource files 116 for identifying DR URLs at the application layer. In doing so, the DR site 104 may execute end-to-end testing without causing (or otherwise reducing) down time of the production site 102. In other words, the DR site 104 may provide services while the production site 102 is operating to verify the operation of the DR site 104.

The files 116 may include any parameters, variables, algorithms, instructions, rules, objects or other directives for identifying DR network addresses (e.g., URLs) in the DR site 102. The resource file 116 may comprise a file, script, executable, template or any other suitable description such that the DR site 104 may perform the services requested by the user of the client 108. In some implementations, the resource files 116 include or otherwise identify one or more network addresses for the DR elements 206. For example, the resource files 116 may include one or more URLs for DR elements executed during transactions. Moreover, the resource files 114 may identify applications executed on the DR elements. In various implementations, the DR URL has a standard naming convention where the term "DR" is placed in front of the production URL to form the DR URL. For example, if a production URL has been defined as http://example.com then the DR URL is preferably defined as http://dr.example.com, using "dr" as the subdomain. Note that a standard internet web URL such as http://dr.example.com, the hierarchical order of the five elements is com (generic top-level domain)—example (second-level domain)—dr (subdomain). Of course, the DR URL can be any suitable URL and achieve the same result, including a DR URL formed by modifying or changing the production URL by adding another word or character in front of the production URL. So long as the DR URL points to the DR elements, the DR site 104 may generate at least substantially similar results. However, the use of a consistent naming convention for DR URLs as described above can, in some implementations, enable a smooth transition to the DR servers in the event of a DR event. In some implementations, the "DR" term may standardize DR URLs within the application code and/or DB tables.

The resource files 116 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. In some implementations, each resource file 116 is included in a different DR network element and processed by applications executed by those DR network elements to identify DR URLs. For example, a particular resource file 116 may merely include one or more hostnames to third-party network elements. In short, the resource file 116 may comprise one table or file or a plurality of tables or files stored on one computer or across a plurality of computers in any appropriate format. Indeed, some or all of resource files 116 may be local or remote and store any type of appropriate data. The resource file 116 may be created or supplied by computer 108, a third party, or any other suitable user of system 100. In some instances, the resource file 116 includes either source code written in or an executable code based on any appropriate language such as, for example, C, C++, Java, Perl, and others.

DNS server 106 comprises a computing device operable to receive, transmit, process and store data for mapping hostnames to network addresses. For example, the DNS server 106 may include one or more translation files including instructions, data mappings, algorithms, or any other directive used by DNS server 106 to convert a domain name to a network address and/or a different hostname. As used herein, convert means to swap, translate, transition, or otherwise modify one or more characters. In general, the DNS server may include one or more of the following parameters: one or more domain names, one or more IP addresses, one or more associated hostnames, one or more record types, one or more TTLs, and others. These parameters may be stored in any suitable format such as, for example, an XML document, a flat file, CSV file, a name-value pair file, SQL table, an array, an object, or others. Such parameters may be stored in any suitable data structure such as an array, matrix, list, table, or any other suitable structure that maps a domain name to a network address and/or a different hostname. DNS server 106, in this example, is a domain name server system. Although only one block is used here to represent DNS server 106, those of skill in the art will recognize that domain name resolution processes will often involve multiple different servers, such as a local DNS server, a root server, a top level domain name server, etc., all of which act together to resolve domain names and URLs into the corresponding internet protocol (IP) addresses.

As used in this disclosure, the client 108 can be any person, department, organization, small business, enterprise, or any other entity that may use or request others to use the system 100. The client 108 can also be a personal computer, touch screen terminal, workstation, network computer, kiosk, wireless data port, smart phone, personal data assistant (PDA), cellular device, one or more processors within these or other devices, or any other suitable electronic device used by a user viewing Web pages from the production site 102 and/or DR site 104. For example, the client 108 may be a PDA operable to wirelessly connect with an external or unsecured network. In another example, the client 108 may comprise a laptop that includes an input device, such as a keypad, touch screen, mouse, or other device that can accept information, and an output device that conveys information from the content provider 104 (e.g., advertisements, search results), including digital data, visual information, or the GUI 112. Both the input device and output device may include fixed or removable storage media such as a magnetic computer disk, CD-ROM, or other suitable media to both receive input from and provide output to users of the client 108 through the display, namely the client portion of the GUI 112.

The GUI 112 comprises a graphical user interface operable to allow the user of the client 108 to interface with at least a portion of the system 100 for any suitable purpose, such as viewing Web pages that may include provide services. Generally, the GUI 112 provides the particular user with an efficient and user-friendly presentation of data provided by or communicated within the system 100. The GUI 112 may comprise a plurality of customizable frames or views having interactive fields, pull-down lists, and/or buttons operated by the user. For example, the GUI 112 is operable to display information in a user-friendly form based on the user context and the displayed data. The term graphical user interface may be used in the singular or in the plural to describe one or more graphical user interfaces and each of the displays of a particular graphical user interface. The GUI 112 contemplates any graphical user interface, such as a generic web browser or touch screen, that processes information in the system 100 and presents the results to the user. The production site 102 and/or the DR site 104 can accept data from the client 108 using, for example, the web browser (e.g., Microsoft Internet Explorer or Mozilla Firefox) and return the appropriate responses (e.g., HTML or XML) to the browser using the network 106.

The network 110 facilitates wireless or wireline communication between the production site 102, the DR site 104 and/or any other local or remote computer, such as the client 108. The network 110 may be all or a portion of an enterprise or secured network. While illustrated as single network, the network 110 may be a continuous network logically divided into various sub-nets or virtual networks without departing from the scope of this disclosure, so long as at least portion of the network 110 may facilitate communications between the production site 102, the DR site 104 and/or the client 108. In some implementations, the network 110 encompasses any internal or external network, networks, sub-network, or combination thereof operable to facilitate communications between various components in the system 100. The network 110 may communicate, for example, Internet Protocol (IP) packets, Frame Relay frames, Asynchronous Transfer Mode (ATM) cells, voice, video, data, and other suitable information between network addresses. The network 110 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2:
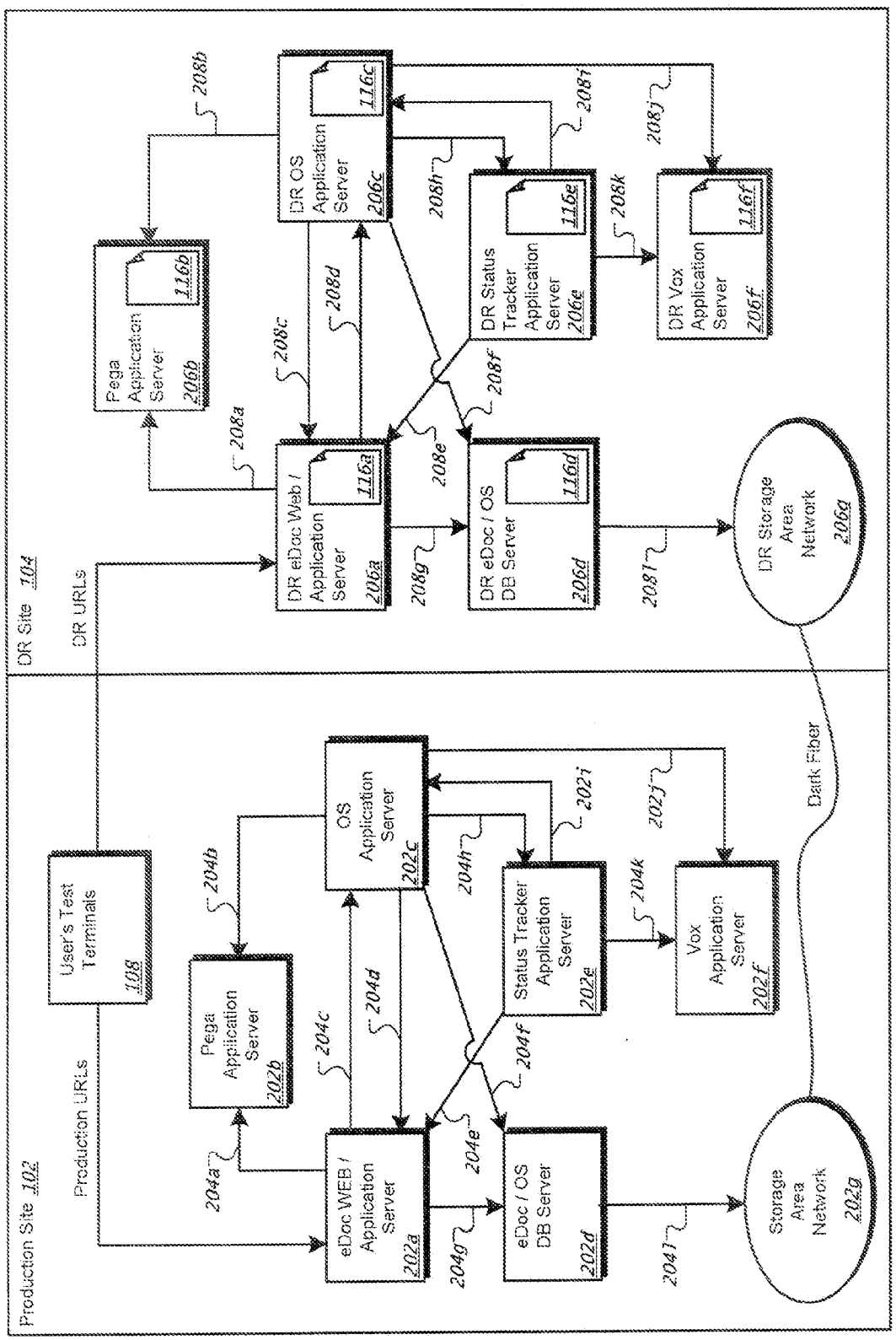
FIG. 2 is a block diagram illustrating an example production site and disaster recovery site.

FIG. 2 illustrates the system 100 including example production site 102 and DR site 104 in accordance with some implementations of the present disclosure. The example production site 102 and DR site 104 are for example purposes only, and the production site 102 and DR site 104 may include some, all, or different network elements and/or interfaces than those illustrated. In the illustrated implementation, the production site 102 includes the production network elements 202a-f, interfaces 204a-l, and resource files 116a-f. In this example, the production elements 202a-f include eDoc WEB application server 202a, Pega application server 202b, OS application server 202c, eDoc/OS database server 202d, Status Tracker application server 202e, Vox application server 202f, and SAN 202g. The DR site 104 includes the DR network elements 206a-g and interfaces 208a-l. In this examples, the DR network elements 206a-g include DR eDoc WEB application server 206a, DR Pega application server 206b, DR OS application server 206c, DR eDoc/OS database server 206d, DR Status Tracker application server 206e, DR Vox application server 206f, and DR SAN 206g.

In regards to the DR site 104, the DR interfaces 208a-l illustrate interfaces between the DR elements 206a-f As illustrated, the DR site 104 may use some or all of these interfaces 208a-l when executing requested transactions or otherwise providing services. The resource files 116a-f identify DR URLs for the different DR elements 206 and enable the different DR elements 206 to communicate using the interfaces 208. In some implementations, the resource files 116 include the DR URLs at the application layer. For example, the resource files 116 may be associated with applications executed by the DR elements 206. In this example, the resources files 116 may be configuration files, application code, database tables, and/or other types of files. In some implementations, the DR elements 208 may process configuration files at the application layer to identify DR URLs.

In some implementations, the DR site 104 defines the DR URLs based, at least in part, on the production URLs. For example, the Production URL for the eDoc web/app server 202a may be defined as http://prod.edoc.cba. In this implementation, the DR URL for the DR eDoc server 206a may be defined as http://dr-prod.edoc.cba. In some implementations, defining the DR URLs based on the Production URLs may allow users from their desktop to execute the DR URL to test the DR environment in isolation without impacting the production site 102. Similarly, OS users may access the DR OS server 206*c* by entering the DR URL (http://dr.os.cba:5555). In regards to end-to-end testing, DR eDoc server 206*a* interfaces other DR elements 206 such as DR OS server 206*c*, so the DR eDoc server 206*a* identifies the DR URLs for those DR elements 206 based, at least in part, on the resource file 116*a*. In some implementations, the DR eDoc 206*a* is configured at the application layer such as, for example, adding DR URLs to the resource file 116*a*. For example, the resource file 116*a* may include hostnames such as http://dr.os.cba/soap/rpc or http://dr.os.cba:5432/soap/rpc to redirect outbound traffic to DR OS server 206*c*. Similarly, for the DR OS 206*c* to communicate to the DR eDoc 206*a*, the resource file 116*c* may include DR URL in, for example, DR OS configuration file, application code and/or database table such as https://dr-prod.edoc.cba/autofeed.asmx or https://dr-prod.edoc.cba/UpdateSTPSID.asmx.

In addition, the DR eDoc 206*a* and/or the DR OS 206*c* may have inbound and/or out bound traffic that interfaces other systems such as the Pega 206*b*, DR DB server 206*d*, the DR Status Tracker 206*e*, the DR Vox 206*f* and/or other systems. In some implementations, the DR elements 206 may be configured at the application layer to include DR URLs for other DR elements 206. In this case, for the client 108 to perform end-to-end DR testing, the application layer for the DR site 104 includes inbound and/or outbound DR URL configuration to direct traffic to those DR elements 206. For example, the DR URLs may be included in configuration files, application code, database table, and/or other files.

Figure 3:
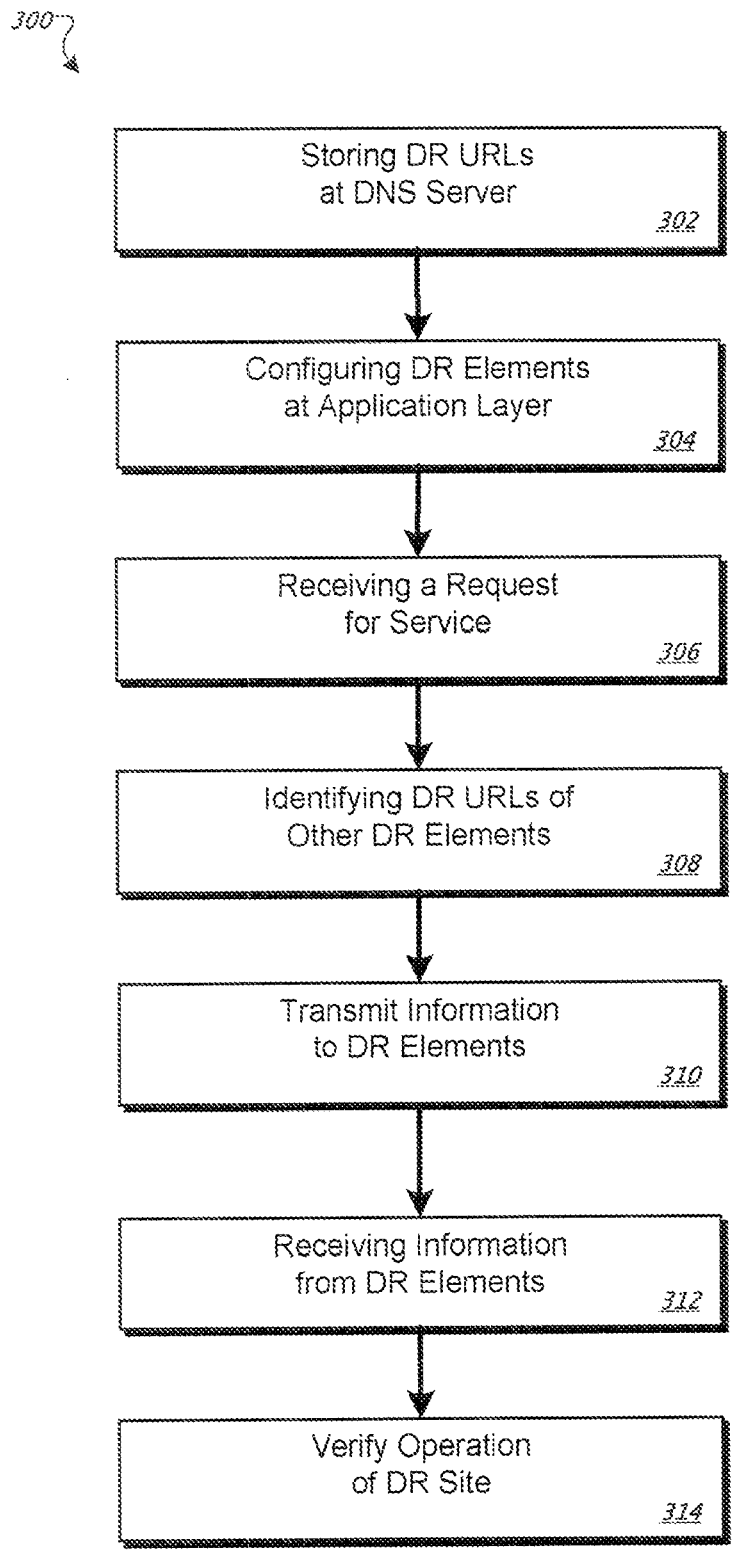
FIG. 3 is a flow chart illustrating an example method for providing end-to-end testing of a disaster recovery site.

FIG. 3 is a flowchart illustrating an example method 300 for end-to-end testing of a DR site. Generally, the method 300 describes one example technique for the system 100 to DR URLs at the application layer to verify operation of the DR site 104. The following descriptions will focus on the operation of the system 100 in performing this method. But, as with the previous figure, system 100 can use any appropriate combination and arrangement of logical elements implementing some or all of the described functionality.

Method 300 begins at step 302 where DR URLs are stored at the DNS server 106. At step 304, DR elements in the DR site 104 are configured at the application layer to include DR URLs. Next, at step 306, a request for services is received from the client 108. In response to at least the request, the DR URLs of other DR elements are identified at step 308. Information associated with the request is transmitted to the DR elements using the identified DR URLs at step 310. At step 312, information from the DR elements is received. Next, at step 314, end-to-end operation of the DR site 104 is verified based, at least in part, on the received information.

A number of implementations of the invention have been described. Nevertheless, it will be understood that various modifications may be made without departing from the spirit and scope of the invention. Accordingly, other implementations are within the scope of the following claims.

What is claimed is:

1. A method, comprising:
    configuring a disaster recovery site with network addresses to disaster recovery elements at an application layer;
    executing an end-to-end test transaction by sending the end-to-end test transaction directly to the disaster recovery site, wherein an associated production site does not receive or execute the end-to-end test transaction, and the end-to-end test transaction includes applications executed by different ones of the disaster recovery elements; and
    verifying end-to-end operation of the disaster recovery site based on a result of the end-to-end test transaction and using the network addresses at the application layer, wherein the disaster recovery site is verified while the associated production site is operating.

2. The method of claim 1, wherein the disaster recovery network addresses to the disaster recovery elements are based, at least in part, on network addresses for network elements in the production site.

3. The method of claim 2, wherein the disaster recovery network addresses are subdomains of the production network addresses.

4. The method of claim 1, wherein configuring the disaster recovery site comprises storing the disaster recovery network addresses in configuration files locally stored on the disaster recovery network elements.

5. The method of claim 1, further comprising storing the disaster recovery network addresses at at least one Domain Name Server (DNS).

6. The method of claim 1, wherein the result of the end-to-end test transaction comprises a verification of each interface between the disaster recovery elements.

7. The method of claim 1, wherein the disaster recovery network elements are substantially similar to network elements in the production site.

8. A system, comprising:
    memory for storing information associated with a disaster recovery site; and
    one or more processors operable to:
        configure a disaster recovery site with network addresses to disaster recovery elements at an application layer;
        execute an end-to-end test transaction by sending the end-to-end transaction directly to the disaster recovery site, wherein an associated production site does not receive or execute the end-to-end transaction, and the end-to-end test transaction includes applications executed by different ones of the disaster recovery elements; and
        verify end-to-end operation of the disaster recovery site based on a result of the end-to-end test transaction and using the network addresses at the application layer, wherein the disaster recovery site is verified while the associated production site is operating.

9. The system of claim 8, wherein the disaster recovery network addresses to the disaster recovery elements are based, at least in part, on network addresses for network elements in the production site.

10. The system of claim 9, wherein the disaster recovery network addresses are subdomains of the production network addresses.

11. The system of claim 8, wherein the processors operable to configure the disaster recovery site comprises the processors operable to store the disaster recovery network addresses in configuration files locally stored on the disaster recovery network elements.

12. The system of claim 8, the processors further operable to store the disaster recovery network addresses at at least one Domain Name Server (DNS).

13. The system of claim 8, wherein the result of the end-to-end test transaction comprises a verification of each interface between the disaster recovery elements.

14. The system of claim 8, wherein the disaster recovery network elements are substantially similar to network elements in the production site.

15. An article comprising a machine-readable medium storing instructions for causing data processing apparatus to:
    configure a disaster recovery site with network addresses to disaster recovery elements at an application layer;

execute an end-to-end test transaction by sending the end-to-end transaction directly to the disaster recovery site, wherein an associated production site does not receive or execute the end-to-end transaction, and the end-to-end test transaction includes applications executed by different ones of the disaster recovery elements; and verify end-to-end operation of the disaster recovery site based on a result of the end-to-end test transaction and using the network addresses at the application layer, wherein the disaster recovery site is verified while the associated production site is operating.

16. The article of claim 15, wherein the disaster recovery network addresses to the disaster recovery elements are based, at least in part, on network addresses for network elements in the production site.

17. The article of claim 16, wherein the disaster recovery network addresses are subdomains of the production network addresses.

18. The article of claim 15, wherein the instructions operable to configure the disaster recovery site comprises the instructions operable to store the disaster recovery network addresses in configuration files locally stored on the disaster recovery network elements.

19. The article of claim 15, the instructions further operable to store the disaster recovery network addresses at at least one Domain Name Server (DNS).

20. The article of claim 15, wherein the result of the end-to-end test transaction comprises a verification of each interface between the disaster recovery elements.

* * * * *